(12) United States Patent
Lee et al.

(10) Patent No.: US 8,165,356 B2
(45) Date of Patent: Apr. 24, 2012

(54) APPARATUS AND METHOD FOR DETERMINING THE ACCEPTABILITY OF A FINGERPRINT IMAGE TO BE ANALYZED

(75) Inventors: Dong-Jae Lee, Seoul (KR); Jun-sung Yoon, Seoul (KR); Won-churl Jang, Seoul (KR); Deok-soo Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1347 days.

(21) Appl. No.: 11/798,836

(22) Filed: May 17, 2007

(65) Prior Publication Data

US 2010/0254579 A1   Oct. 7, 2010

(30) Foreign Application Priority Data

Aug. 21, 2006  (KR) .................. 10-2006-0078980

(51) Int. Cl.
*G06K 9/00*  (2006.01)
(52) U.S. Cl. ...... 382/124; 340/5.53; 340/5.83; 382/218; 902/3
(58) Field of Classification Search ................ 340/5.83; 382/124, 125; 902/3
See application file for complete search history.

(56) References Cited

U.S. PATENT DOCUMENTS

| | | | |
|---|---|---|---|
| 6,005,963 A * | 12/1999 | Bolle et al. .................. 382/124 | |
| 6,289,112 B1 | 9/2001 | Jain et al. | |
| 6,314,197 B1 | 11/2001 | Jain et al. | |
| 6,400,836 B2 * | 6/2002 | Senior ........................ 382/124 | |
| 6,526,396 B1 * | 2/2003 | Hiratsuka et al. ............ 706/52 | |
| 6,763,127 B1 | 7/2004 | Lin et al. | |
| 6,961,453 B2 * | 11/2005 | Yoon et al. .................. 382/125 | |
| 7,027,626 B2 * | 4/2006 | Funada ...................... 382/125 | |
| 7,072,523 B2 | 7/2006 | Bolle et al. | |
| 7,073,711 B2 | 7/2006 | Fernandez et al. | |
| 7,489,807 B2 * | 2/2009 | Hwang et al. ................ 382/124 | |
| 7,711,158 B2 * | 5/2010 | Ahn et al. ................... 382/124 | |
| 7,778,449 B2 * | 8/2010 | Shinzaki .................... 382/124 | |
| 2002/0021827 A1 * | 2/2002 | Smith ........................ 382/124 | |
| 2003/0091724 A1 * | 5/2003 | Mizoguchi ................... 427/1 | |
| 2007/0014440 A1 * | 1/2007 | Lo ............................ 382/124 | |
| 2008/0013803 A1 * | 1/2008 | Lo et al. .................... 382/124 | |
| 2010/0254579 A1 * | 10/2010 | Lee et al. ................... 382/124 | |

FOREIGN PATENT DOCUMENTS

JP   2002-288641   10/2002

OTHER PUBLICATIONS

Lee, et al. "A Real-Time Image Selection Algorithm: Fingerprint Recognition using Mobile Devices with Embedded Camera" Automatic Identification Advanced Technologies, 2005. IEEE, Oct. 18, 2005, pp. 166-170.
Japanese Office Action for JP 2007-213805, Dong-Jae Lee, et al.

* cited by examiner

*Primary Examiner* — Gregory M Desire
(74) *Attorney, Agent, or Firm* — Lee & Morse, P.C.

(57) ABSTRACT

A method of determining acceptability of an image of a fingerprint to be analyzed, includes dividing the image into a plurality of blocks, determining a focus for each block, determining a validity of a block, the block being valid if the focus is sufficient, otherwise the block being invalid, totaling a number of valid blocks in the image, and determining a validity of the image, the image being valid if a number of valid blocks is sufficient.

21 Claims, 8 Drawing Sheets

APPARATUS AND METHOD FOR DETERMINING THE ACCEPTABILITY OF A FINGERPRINT IMAGE TO BE ANALYZED

BACKGROUND OF THE INVENTION

1. Field of the Invention

Embodiments of the present invention relates to an apparatus and method for determining the acceptability of a fingerprint image to be analyzed.

2. Description of Related Art

As the functionality of mobile devices increases, more and more private information is being stored on these mobile devices. This trend has increased demand for security precautions tighter than those typically employed, e.g., entry of a personal identification number (PIN).

One proposed solution is the inclusion of a sensor for fingerprint verification. This additional sensor increases expense. Therefore, using a component already present in the mobile devices is desirable. However, in employing an embedded camera, determination of an acceptable image for fingerprint verification remains a fundamental issue.

SUMMARY OF THE INVENTION

Embodiments of the present invention is therefore directed to a method and apparatus for determining the acceptability of a fingerprint image to be analyzed, which substantially overcome one or more of the problems due to the limitations and disadvantages of the related art.

It is therefore a feature of an embodiment of the present invention to provide an apparatus and method that estimates a focus of an image of a fingerprint by dividing the image into block and exploiting the repeatable pattern of a fingerprint image, i.e., a pattern of ridges and valleys.

It is another separate feature of an embodiment of the present invention to provide an apparatus and method that estimate a quality index of an image of a fingerprint by eliminating unfocused regions and non-finger regions of the image.

It is yet another separate feature of an embodiment of the present invention to provide an apparatus and method that estimates an amount of pitching and rolling of an imaged finger.

At least one of the above and other features and advantages may be realized by providing a method of determining acceptability of an image of a fingerprint to be analyzed, the method including dividing the image into a plurality of blocks, determining a focus for each block, determining a validity of a block, the block being valid if the focus is sufficient, otherwise the block being invalid, totaling a number of valid blocks in the image, and determining a validity of the image, the image being valid if a number of valid blocks is sufficient.

The number of valid blocks may be sufficient if a ratio of the number of valid blocks to the plurality of blocks exceeds a predetermined threshold.

Determining whether the block is sufficiently focused may include comparing a measured focus to a focus threshold determined from a blur model.

The method may include determining, for each block, whether the block includes a repeatable pattern, and wherein determining the status of the block includes determining the block to be valid when the block is sufficiently focused and has a repeatable pattern, otherwise, determining the block to be invalid. Determining whether the block includes a repeatable pattern may include determining a quality index that includes coherence and symmetry of a gradient distribution of the block. The quality index may be a weighted sum of the coherence and symmetry.

The method may include, if the image is valid, detecting a core and a contour of the image, determining a rolling degree and a pitching degree from the core and the contour, and selecting the image for further processing when the rolling degree and the pitching degree are sufficiently small.

Determining the rolling degree may include determining a left distance between the core and a left edge of the contour, determining a right distance between the core and a right edge of the contour, and determining the rolling degree to be proportional to a ratio between an absolute difference between the right and left distances and a sum of the right and left distances.

Determining the pitching degree may include determining a forwards pitching degree and determining a backwards pitching degree. Determining the pitching degree may include determining a first distance from the core to a front edge of a valid region, determining a second distance from the core to a front of the contour, and determining a third distance from the core to a back edge of the valid region, wherein the forwards pitching degree is proportional to a ratio of the first distance to the second distance and the backwards pitching degree is proportional to a ratio of the third distance to the second distance. The front edge of the valid region and the back edge of the valid region may be determined such that a width of the valid region at either of the front and back edges is larger than half of a width of left and right edges of the contour.

Determining the pitching degree may include determining a left distance $D_L$ between the core and a left edge of the contour, determining a right distance $D_R$ between the core and a right edge of the contour, determining a front distance $D_F$ from the core to a front edge of a valid region, determining a back distance $D_B$ from the core to a back edge of the valid region, and setting N to be greater than a ratio between a width and height of the valid region, wherein the pitching degree equals $N-(D_F+D_B)/(D_L+D_R)$.

The front edge of the valid region and the back edge of the valid region may be determined such that a width of the valid region at either of the front and back edges is larger than half of a width of left and right edges of the contour.

Generating the image may be realized using a camera, e.g., a camera that is part of a handheld device.

Determining if the block is sufficiently focused may include using a Variance-Modified-Lapalacian of Gaussian (VMLOG) method. The VMLOG method may include at least one of the following equations:

$$\nabla_M^2 [G*I] = \max\left\{\frac{\partial^2 (G*I)}{\partial x^2}, \frac{\partial^2 (G*I)}{\partial y^2}\right\};$$

$$MLOG_x = \sum_{k=-N}^{N} \omega_k I(x-k(\text{step}), y);$$

$$MLOG_Y = \sum_{k=-N}^{N} \omega_k I(x, y-k(\text{step}));$$

$$MLOG = \max\{MLOG_x, MLOG_y\}; \text{ and}$$

$$VMLOG = \text{VAR}\{MLOG\}.$$

At least one of the above and other features and advantages may be realized by providing a method of determining acceptability of an image of a fingerprint to be analyzed, the method including dividing the image into a plurality of blocks, determining, for each block, whether a block includes a repeatable pattern, determining a validity of a block, the block being valid if the block includes a repeatable pattern, otherwise the block being invalid, totaling a number of valid blocks in the image, and determining the image is valid if the number of valid blocks is acceptable.

The number of valid blocks may be acceptable if a ratio of the number of valid blocks to the plurality of blocks exceeds a predetermined threshold.

At least one of the above and other features and advantages may be realized by providing an article of manufacture having a machine accessible medium including data that, when accessed by a machine, cause the machine to determine acceptability of an image of a fingerprint to be analyzed, the determining including dividing the image into a plurality of blocks, determining, for each block, whether the block is in focus, determining a status of a block, the block being valid if the block is in focus, otherwise the block being invalid, totaling a number of valid blocks in the image, and determining the image is valid if the number of valid blocks is acceptable.

At least one of the above and other features and advantages may be realized by providing an apparatus for determining acceptability of an image of a fingerprint to be analyzed, the apparatus including a divider the image into a plurality of blocks, a focus estimator for determining, for each block, whether the block is sufficiently focused, a focus decider for comparing focus of a block with a threshold focus, the block being valid if the block is sufficiently focused, otherwise the block being invalid, and a validity decider for totaling a number of valid blocks in the image, the image being valid if the number of valid blocks is acceptable.

At least one of the above and other features and advantages may be realized by providing a method of determining acceptability of an image of a fingerprint to be analyzed, the method including detecting a core and a contour of the image, determining a rolling degree and a pitching degree from the core and the contour, and selecting the image for further processing when the rolling degree and the pitching degree are acceptable.

Determining the rolling degree may include determining a left distance between the core and a left edge of the contour, determining a right distance between the core and a right edge of the contour, and determining the rolling degree to be proportional to a ratio between an absolute difference between the right and left distances and a sum of the right and left distances.

The method may include determining a valid region of the fingerprint image, the valid region including a repeatable pattern.

The method may include determining the pitching degree may include determining a forwards pitching degree, and determining a backwards pitching degree.

The method may include determining a first distance from the core to a front edge of the valid region, determining a second distance from the core to a front of the contour, and determining a third distance from the core to a back edge of the valid region, wherein the forwards pitching degree is proportional to a ratio of the first distance to the second distance and the backwards pitching degree is proportional to a ratio of the third distance to the second distance.

The front edge of the valid region and the back edge of the valid region may be determined such that a width of the valid region at either of the front and back edges is larger than half of a width of left and right edges of the contour.

At least one of the above and other features and advantages may be realized by providing an article of manufacture having a machine accessible medium including data that, when accessed by a machine, cause the machine to determine acceptability of an image of a fingerprint to be analyzed, the determining including detecting a core and a contour of the image, determining a rolling degree and a pitching degree from the core and the contour, and selecting the image for further processing if the rolling degree and the pitching degree are sufficiently small.

At least one of the above and other features and advantages may be realized by providing a system for determining acceptability of an image of a fingerprint to be analyzed, the system including a detector detecting a core and a contour of the image, and a processor determining a rolling degree and a pitching degree from the core and the contour, and selecting the image for further processing when the rolling degree and the pitching degree are sufficiently small.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Figure 1:
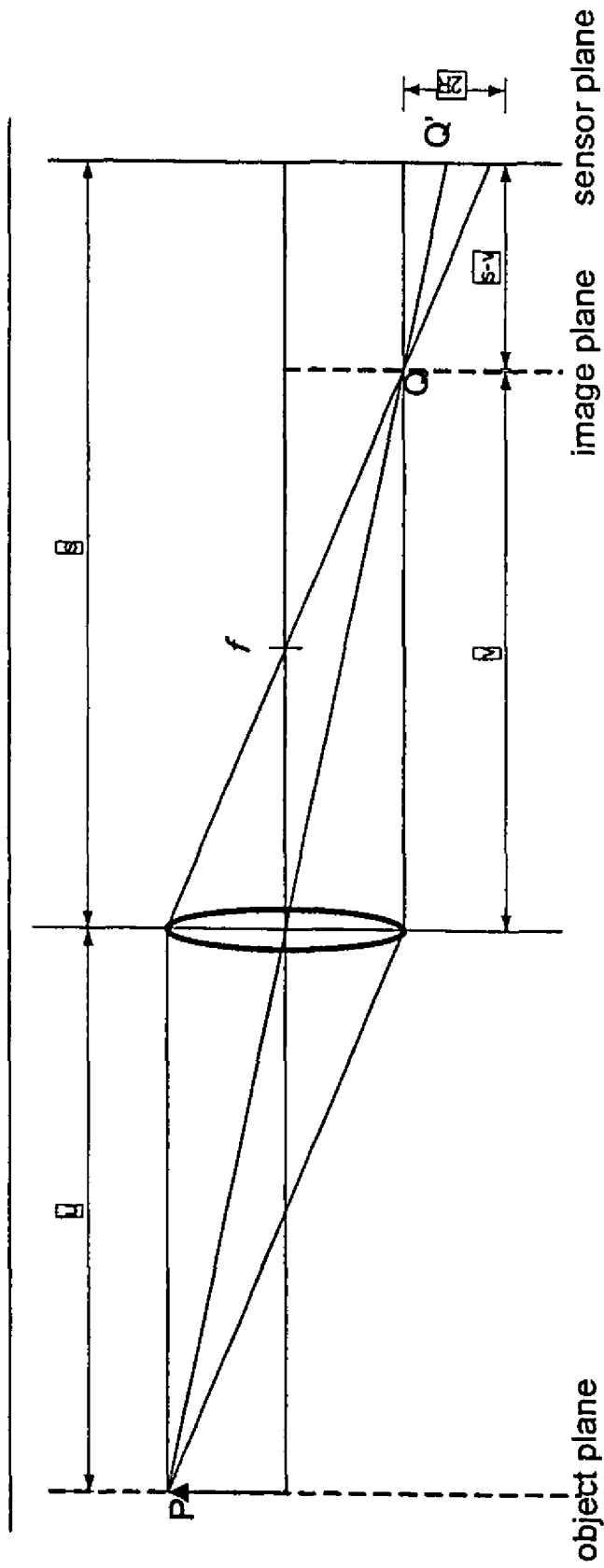
FIG. 1 illustrates a ray trace explaining optical image formation.

Korean Patent Application No. 2006-0078980, filed on Aug. 21, 2006, in the Korean Intellectual Property Office, and U.S. Provisional Application No. 60/852,014, filed on Oct. 17, 2006, in the U.S. Patent & Trademark Office, both entitled: "Apparatus and Method for Determining the Acceptability of a Fingerprint Image to be Analyzed," are both hereby incorporated by reference in their entirety for all purposes.

Embodiments of the present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the figures, the dimensions of layers and regions are exaggerated for clarity of illustration. Like reference numerals refer to like elements throughout.

A method and apparatus for determining the acceptability of a fingerprint image for fingerprint verification will be described in detail below. First, basic image formation is outlined, as illustrated in FIG. 1.

Typically, the most focused image is the highest quality image. Auto-focusing is typically used to realize this most focused image. Auto-focusing mainly includes calculating a focus measure for images at different lens position, and moving the lens to the maximum focus measure position. The relationship between an object distance u, a focal length of the lens f, and the image distance v is described by the Gaussian lens law, given by Equation 1:

$$\frac{1}{f} = \frac{1}{u} + \frac{1}{v} \quad (1)$$

When an object point P is exactly focused, the image distance v equals a sensor distance s, and the image plane corresponds with the sensor plane. If the sensor plane is displaced from the image plane by a distance s-v, the object point P is blurred over a circular region Q' with a radius R ($\sigma_b$) on the sensor plane. The resultant distribution of light energy over this circular region may be approximated by Equation 2:

$$B(x, y) = \frac{1}{\sqrt{2\pi}\sigma_b} e^{-\frac{x^2+y^2}{2\sigma_b^2}} \quad (2)$$

A focused image contains more high frequency information than a defocused image, and most auto-focus techniques rely on this differentiation. However, the use of auto-focusing for fingerprint image acquisition is problematic, as discussed below, and typically requires a special tool to insure the proper positioning of the finger. However, additional tools may not be the optimal solution for either the user or the manufacturer.

Even if an appropriate distance between a finger and a sensor may be determined, other factors still may effect the processing of the fingerprint image. For example, when focusing on an object in close proximity to the sensor plane, the shape of that object will affect the degree of focus. An area that is perpendicular to the optical axis of the camera will be well focused. However, since a finger has a cylindrical shape and tapers to the fingertip, much of the image of the finger may be considered defocused. If only a well focused region of the finger image is considered valid, the usable image may be insufficient for fingerprint recognition. Further, given the curved shape of a finger, roll and pitch of the finger relative to the sensor may further render an image unsuitable for fingerprint recognition.

In accordance with exemplary embodiments of the present invention, a system and a method for determining the acceptability of a fingerprint image for fingerprint recognition may include three components to address at least the above problems. First, focus estimation may estimate a focus of a finger by dividing the image into blocks, and exploiting the repeatable pattern of a fingerprint image, i.e., a pattern of ridges and valleys. Second, quality estimation may estimate the quality index of a valid region by eliminating unfocused regions and non-finger regions of the image. These two components are disclosed in Doon-gae Lee et al., "A Real-Time Image Selection Algorithm Fingerprint Recognition using Mobile Devices with Embedded Camera," *Proceeding of the Fourth IEEE Workshop on Automatic Identification Advanced Technologies*, Oct. 17-18, 2005, which is herein incorporated by reference in its entirety for all purposes. Third, pose estimation may estimate an amount of pitching and rolling of the imaged finger. Based on at least one of these three, an image may be selected as acceptable for fingerprint recognition.

Figure 2:
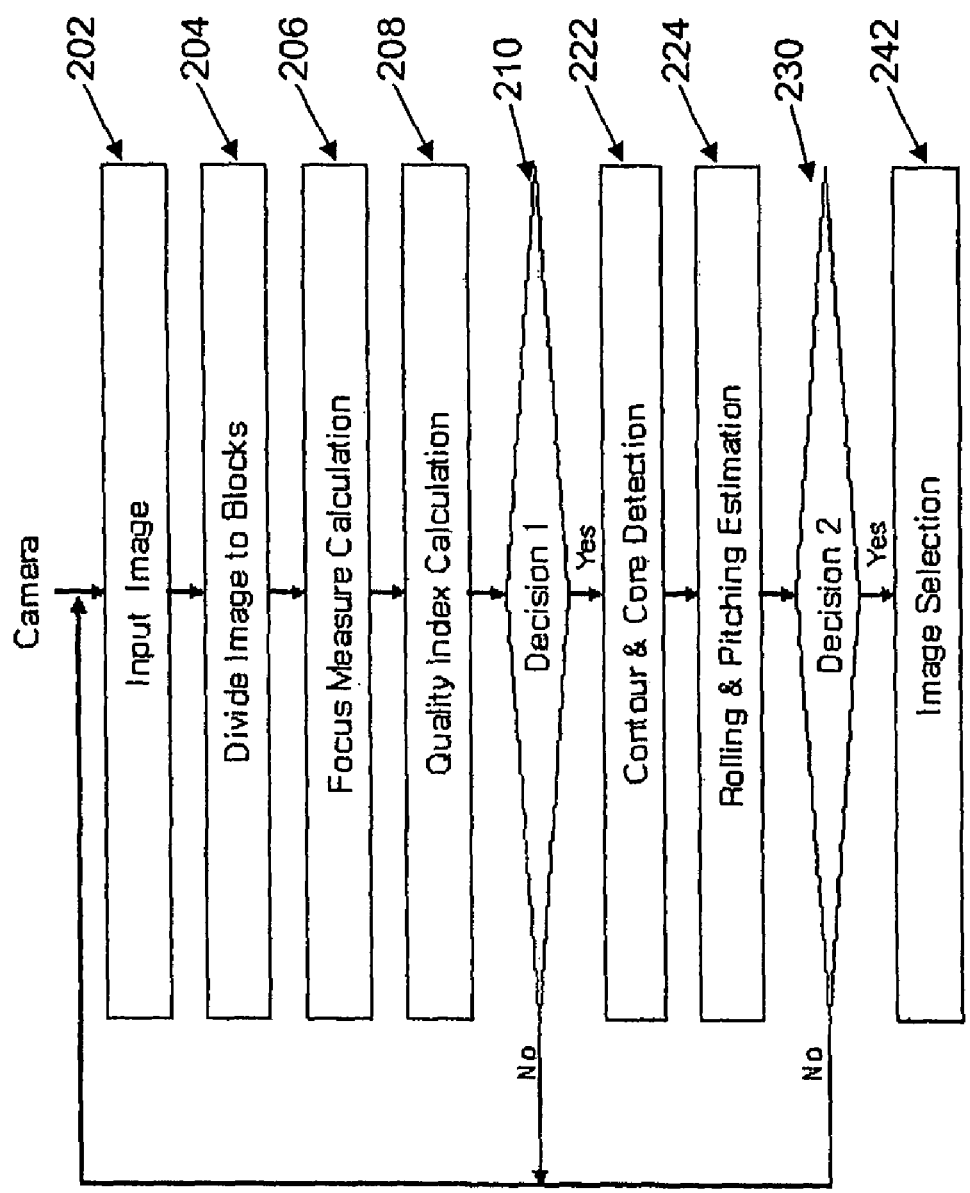
FIG. 2 illustrates a flow chart of a general process in accordance with an exemplary embodiment of the present invention.

A flowchart of a general operation in accordance with an exemplary embodiment of the present invention is illustrated in FIG. 2. First, in step 202, an image, e.g., from a camera, scanner, or other image input device, may be received as an input image. In step 204, the image may be divided into blocks. In step 206, a focus measure may be calculated. In step 208, a quality index may be calculated. In step 210, a first decision 1 regarding the validity of the image for fingerprint analysis may be made. If step 210 determines the image may be invalid, another image may be input, and the process may begin again at step 202. If step 210 determines the image may be valid, the process may proceed to step 222, in which pose of a finger being imaged may be estimated, e.g., by detecting contour and core of the image. In step 224, roll and pitch of the finger being imaged may be estimated. In step 230, a second decision 2 regarding the acceptability of the image for fingerprint analysis may be made. If step 230 determines the image is not acceptable, another image may be input, and the process may begin again at step 202. If step 230 determines the image is acceptable, the image may be selected in step 242 to be subjected to known fingerprint analysis.

Figure 3:
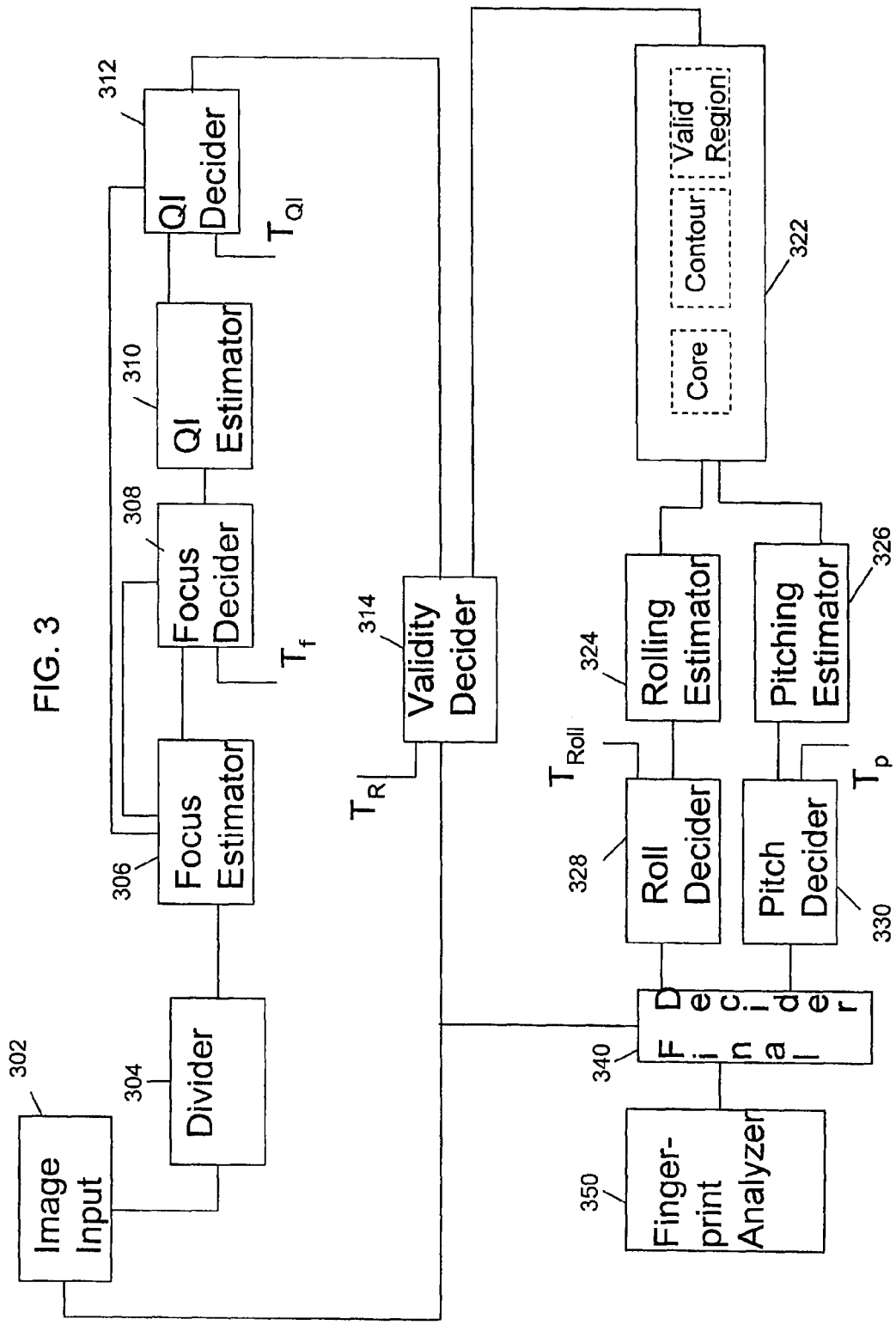
FIG. 3 illustrates a block diagram of an exemplary embodiment of the present invention.

FIG. 3 illustrates a block diagram of an acceptability determining system in accordance with an exemplary embodiment of the present invention and a fingerprint analyzer 350 for analyzing an acceptable fingerprint image. The system may include an image input 302, a divider 304, a focus estimator 306, a focus decider 308, a QI estimator 310, a QI decider 312, a validity decider 314, a fingerprint pose analyzer 322, a rolling estimator 324, a pitching estimator 326, a roll decider 328, a pitch decider 330, and a final decider 340. The functions of these blocks may be realized by conventional circuitry as known by those of ordinary skill in the art. The blocks corresponding to the steps in the following description are parenthetically indicated.

First, in step 204 (304), an image received in step 202 (302) may be divided into m*m blocks. For each block, the degree of focus may be estimated. As noted above, while conventional methods may be sufficient for images having a lot of high frequency information, they may not be applicable to close-up, repeatable images. In accordance with an embodiment of the present invention, the focus measurement of step 206 (306) may be determined using a Variance Modified-Laplacian of Gaussian (VMLOG). The modified LOG may be given by the following Equation 3:

$$\nabla_M^2 [G*I] = \max\left\{\frac{\partial^2 (G*I)}{\partial x^2}, \frac{\partial^2 (G*I)}{\partial y^2}\right\} \quad (3)$$

where I is the input image, G is the Gaussian filter and * is the convolution operator.

In order to accommodate for possible variations in the size of repeatable patterns, a variable spacing or step between the pixels may be used. The discrete approximation of the modified LOG may be given by the following Equations 4 to 6:

$$MLOG_x = \sum_{k=-N}^{N} \omega_k I(x - k(\text{step}), y) \quad (4)$$

$$MLOG_y = \sum_{k=-N}^{N} \omega_k I(x, y - k(\text{step})) \quad (5)$$

$$MLOG = \max\{MLOG_x, MLOG_y\} \quad (6)$$

where $\omega_0$ is positive, and the remaining kernels are negative. The value of the kernels and the step may be decided by the intervals of the repeatable patterns.

Finally, the variance of the MLOG is computed as follows:

$$VMLOG = VAR\{MLOG\} \quad (7)$$

where VAR is the variance operator. This focus measure for each block may be compared with a threshold to determine whether the block is sufficiently focused or not.

A threshold to which the VMLOG is compared may be determined using a blur model. For long range images, the degree of blur R may be similar over the entire image, and the focus measurement may be calculated over the entire image. In contrast, in close range images used for fingerprint analysis, the degree of blur between the object area and the background may be very different. This differentiation may be used to distinguish the fingerprint region of the image from the background region.

Figure 4:
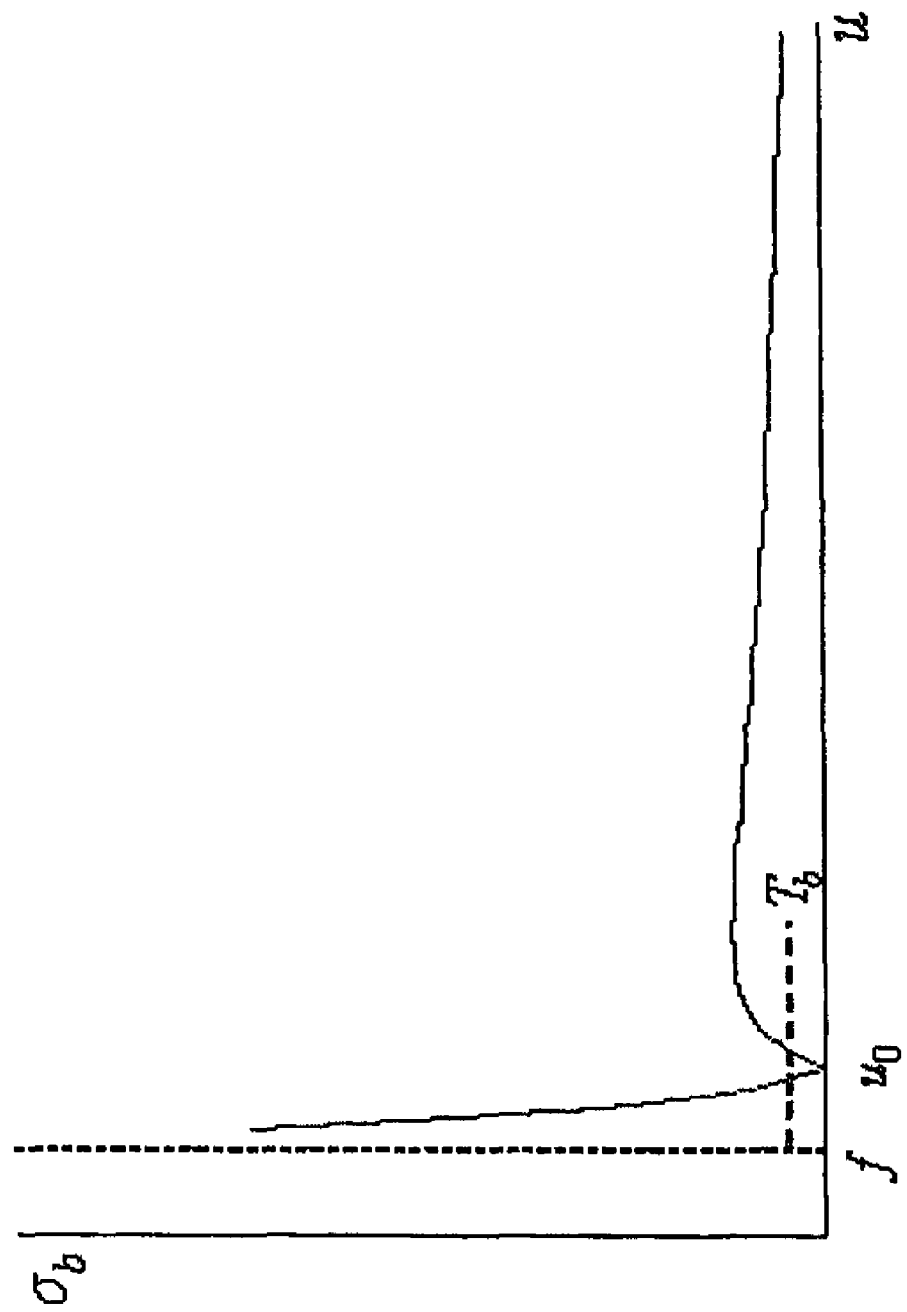
FIG. 4 illustrates a plot of object distance versus blur.

FIG. 4 illustrates the relationship between the degree of blur R and the distance from the lens to the object u. When an image is in focus, $u_0$ is the distance from an object to a lens, and $v_0$ is the distance between a lens and an image plane. When the image is defocused, these respective distances are represented by the variables u and v. The blur effect may be modeled as follows:

$$R = \begin{cases} 0, & u = u_0 \\ H\left(\dfrac{v_0}{u} - \dfrac{f}{u-f}\right), & u > u_0 \\ H\left(\dfrac{f}{u-f} - \dfrac{v_0}{u}\right), & f < u < u_0. \end{cases} \quad (8)$$

By selecting an appropriate blur threshold $T_b$, which may then be used to determine a minimum focus threshold $T_f$, the sufficiency of focus may be assessed.

In addition to calculating the focus measurement, the quality index may be calculated in step 208 (310). The quality index calculation may determine whether the image has a pattern consistent with that of a properly imaged fingerprint, i.e., has a linear repeatable pattern.

Figure 5A:
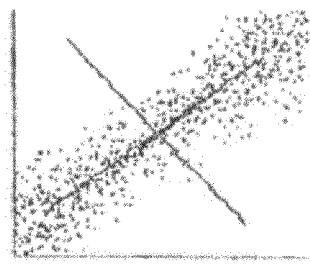
FIGS. 5A-5F illustrate three different images and respective gradients thereof.
Figure 5C:
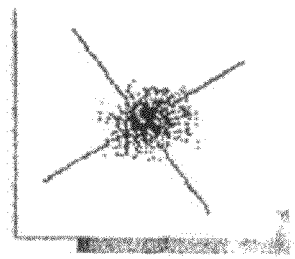
Figure 5E:
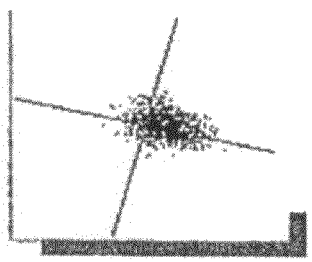
Figure 5B:
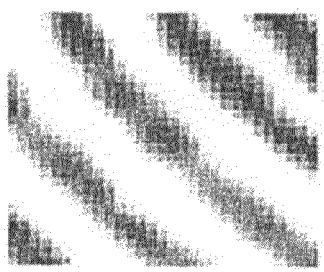
Figure 5D:
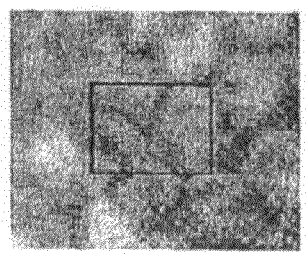
Figure 5F:
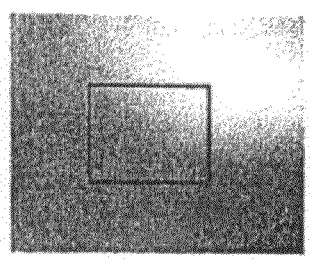

If the input image has an ideal linear pattern, as shown in FIG. 5A, a gradient of the image will be distributed coherently and symmetrically in a direction perpendicular to the direction of the ridge in the fingerprint, as can be seen in FIG. 5B. In a general image, as shown in FIG. 5C, a gradient will be clustered, as shown in FIG. 5D. If the finger is too close, as shown in FIG. 5E, a gradient may be coherent, but not symmetric, as shown in FIG. 5F. Therefore, these two features, i.e., coherence and symmetry, may be examined to determine image quality.

Coherence may be calculated using the following Equation 9.

$$Coh = \dfrac{\sqrt{(G_{xx} - G_{yy})^2 + 4G_{xy}^2}}{G_{xx} + G_{yy}} \quad (9)$$

where $$G_{xx} = \sum G_x^2$$
$$G_{yy} = \sum G_y^2$$
$$G_{xy} = \sum G_x G_y$$

where $G_x$ is the gradient to the x axis and $G_y$ is the gradient to the y axis.

Symmetry is a ratio of the number of gradients above the direction line to the number of gradients below the direction line in the gradient distribution, and may be given by Equation 10.

$$Sym = 1 - \dfrac{|N_p - N_n|}{N_p + N_n} \quad (10)$$

where $N_p$ is the number of gradients above the direction line in FIGS. 4B, 4D or 4F, and $N_n$ is the number of gradients below the direction line.

The quality index (QI) may be a combination of these two attributes, and may be expressed by the following Equation (9):

$$QI = \omega_1 Coh + \omega_2 Sym \quad (9)$$

where $\omega_1$ and $\omega_2$ are weighting coefficients that may be changed in accordance with the specifics of the input device being used.

Figures 6, 7:
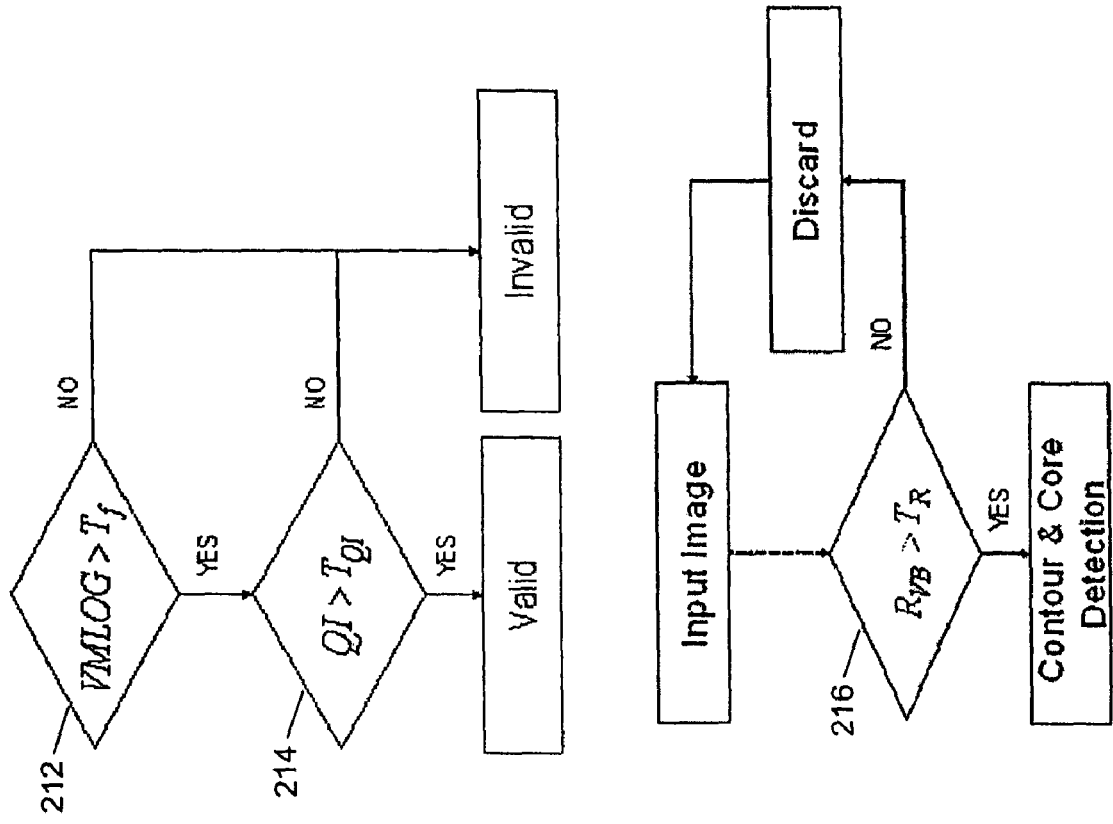
FIGS. 6 and 7 illustrate flow charts of an exemplary embodiment of Decision 1 in FIG. 2.

The validity of each block may then be determined as shown in FIG. 6. Both the VMLOG and the QI may be compared to respective experimentally established thresholds to determine if the block is valid. Threshold $T_f$ for the focus measurement may be obtained from averaging or other statistical analysis of a number of blur models. Threshold $T_{QI}$ for the quality index measurement may be determined by selecting some images from total test images and training using a statistical analysis, e.g., least mean squares. In the particular configuration shown in FIG. 6, if VMLOG is greater than $T_f$ in step 212 (308), then the flow may proceed to step 208 (310). If not, the block may be determined to be invalid, and the flow may return to step 206 (306) for determining the validity of the next block. In step 214 (310), if QI is greater than $T_{QI}$, the block may be determined to be valid. If not, the block is determined to be invalid, and the flow may return to step 206 (306) for determining the validity of the next block. Obviously, the comparison order may be reversed or they may be performed simultaneously. Use of blocks for fingerprint image evaluation, including directionality, is disclosed, for example, in U.S. Pat. No. 6,289,112, entitled "System and Method for Determining Block Direction in Fingerprint Images," the entire contents of which is hereby incorporated by reference for all purposes.

A ratio $R_{VB}$ of a number of valid blocks $N_V$ to a total number of blocks $N_T$ may be compared to a threshold $T_R$, as shown in step 216 (314) of FIG. 7, to determine whether the flow continues to step 222 (322) of FIG. 2, i.e., when $R_{VB}$ is greater than $T_R$, or the image is discarded and the flow returns to step 202 (302). Thus, step 210 of decision 1 may be performed as shown in FIGS. 6 and 7.

Even when the finger is properly focused, the pose of a finger may be altered due to rolling or pitching of the finger, especially when an additional device for securing a finger is not employed. Abrupt changes of the pose between images may reduce a common area and decrease matching performance. Thus, pose variation may be estimated to determine whether the image is recognizable. In accordance with embodiments of the present invention, the pose variations may be estimated using a contour and core of a finger.

In addition to the contour and the core, a valid region may be formed from the valid blocks. In particular, morphological operators may be used to eliminate small valid regions and otherwise smooth the image, as set forth, for example, in U.S. Pat. No. 6,763,127, entitled "Apparatus and Method for Fingerprint Recognition System," the entirety of which is hereby incorporated by reference for all purposes. If more than one valid region still is present, a largest valid region may be selected. If invalid regions are present in the largest valid region, they may be absorbed into the valid region. A relationship between the contour, the core, the valid region, and the position of the finger is illustrated in FIG. 8.

Figure 8:
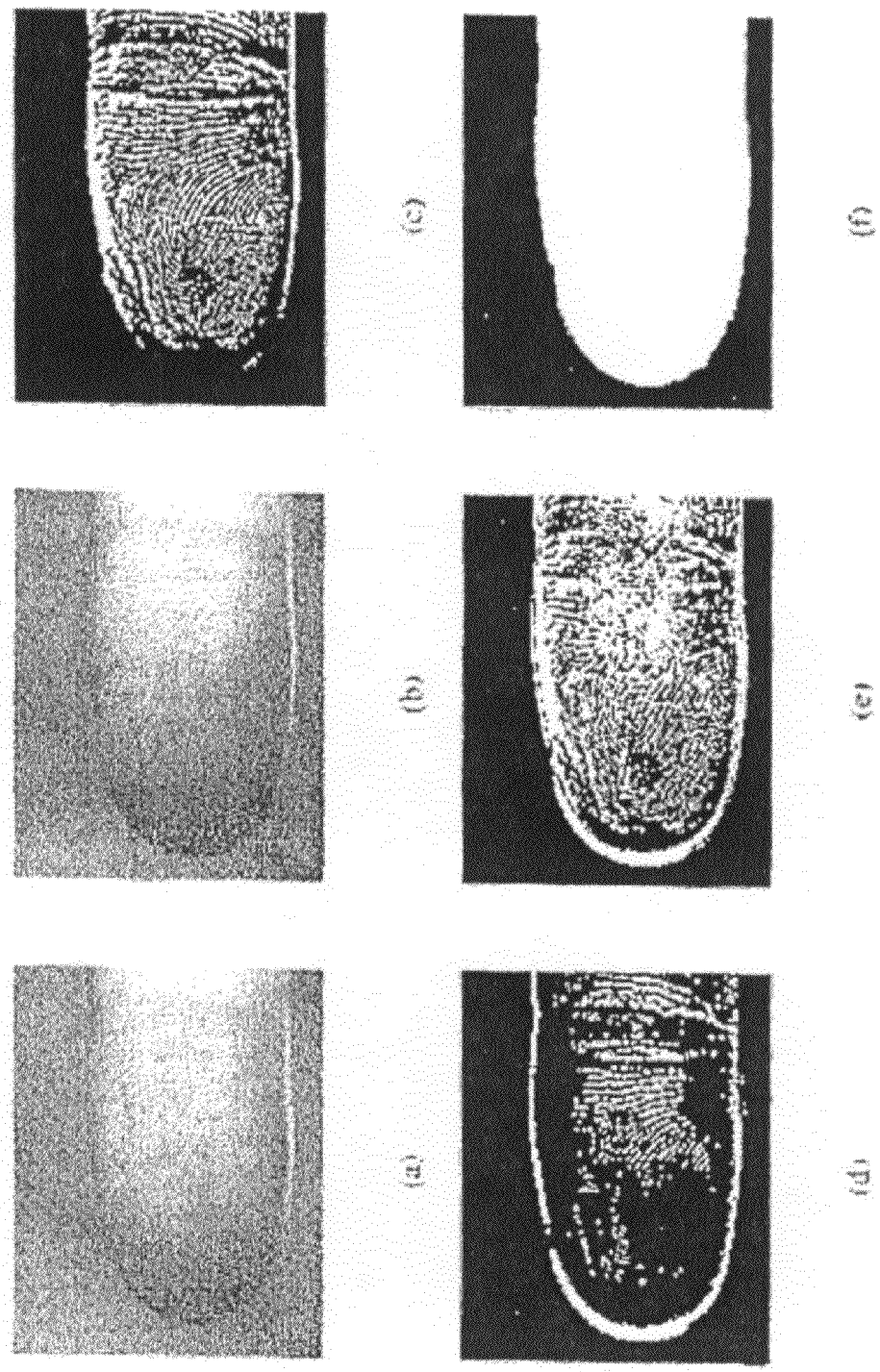
FIG. 8 illustrates a finger position estimation model in accordance with an exemplary embodiment of the present invention.

Contour of the finger may be extracted using differences between sequential, valid images, e.g., by using two binary subtraction images as shown in FIG. 8, where FIG. 8(a) illustrates an $n^{th}$ frame image, FIG. 8(b) illustrates an $n-1^{th}$ frame image, FIG. 8(c) illustrates an $SI_P$ image, FIG. 8(d) illustrates an $SI_N$ image, FIG. 8(e) illustrates DI image, and FIG. 8(f) illustrates a foreground region. These relationships may be represented by the following Equations 12 to 14:

$$SI_P(x, y) = \begin{cases} 1 & \text{if} \quad I_n(x, y) - I_{n-1}(x, y) > T_P \\ 0 & \text{otherwise} \end{cases} \quad (12)$$

$$SI_N(x, y) = \begin{cases} 1 & \text{if} \quad I_{n-1}(x, y) - I_n(x, y) > T_N \\ 0 & \text{otherwise} \end{cases} \quad (13)$$

$$DI_n(x, y) = \begin{cases} 1 & \text{if} \quad |SI_P(x, y) - SI_N(x, y)| > T_D \\ 0 & \text{otherwise} \end{cases} \quad (14)$$

While the above methodology employs two images, contour extraction may also be realized using a single image, although more data points within the single image may need to be analyzed and correlated, thus increasing time for contour extraction.

While numerous algorithms may be known for detecting singular points in fingerprint images, for estimating an upper core point for point estimation, a simple known algorithm for determining coarse position, e.g., the Poincare index, may be used. At the core point, the Poincare index is ½. The core detection may only be performed on valid blocks.

Once the contour, the core, and the valid region have been detected, the finger pose may be analyzed as set forth below.

Roll of a finger is the right or left rotation of the finger along a longitudinal axis of the finger. The rolling degree $R_0$ may be determined using a distance from the core to a left side of the contour R1 and a distance from the core to a left side of the contour R2, and may be given by the following Equation 15:

$$R_0 = \frac{|R1 - R2|}{R1 + R2} \quad (15)$$

As can be seen from FIG. 8, as the position of the core approaches the center of the finger, the rolling degree approaches zero. The further the core is to either side, the rolling degree approaches one.

Pitch of a finger is the up or down orientation of the finger. When a finger is pitched, a surface area of the finger that is orthogonal to the image plane decreases. If the depth of field of the camera is fixed, an increase in pitching rate may reduce an area of the valid region. Even when the pitching rate is small enough that a sufficiently large valid region is obtained, the image still may not be recognizable. For example, if the core is located near an edge of the valid region or is not in the valid region, the image may not be selected.

Figure 9:
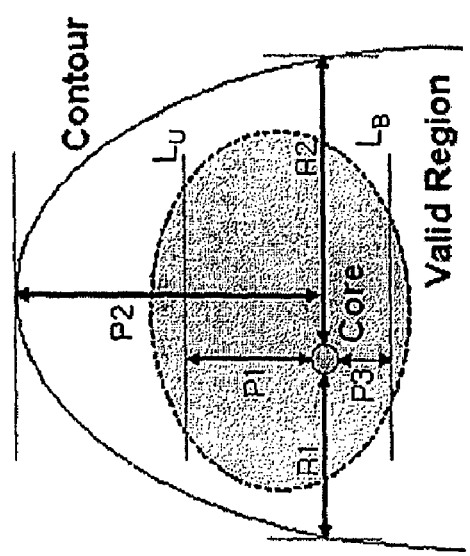
FIG. 9 illustrates finger contour extraction images.

As shown in FIG. 9, boundary lines $L_U$ and $L_B$ may be determined, at a minimum, where a width of the valid region is larger than half a width of the finger. Distance P1 is the distance from the core point to the upper boundary line $L_U$ and P3 is the distance from the core point to the lower boundary line $L_B$. The pitching rate $P_{rate}$ may by approximated by the following Equation:

$$P_{rate} = N - \frac{P1 + P3}{R1 + R2} \quad (16)$$

where N is a number greater than the ratio of the width of the finger and the vertical length of the valid region. The position $P_{POS}$ of the core point within the valid region may be estimated by the following:

$$P_{POS} = \frac{|P1 - P3|}{P1 + P3} \quad (17)$$

As the core point is closer to the vertical center of the valid region, $P_{POS}$ decreases. As the core point moves to either edge of the valid region, $P_{POS}$ increases.

Additionally or alternatively, a distance P2 between the core and a tip of the finger may be determined, and a forward pitch $P_F$ and a backwards pitch $P_B$ may be determined as follows in accordance with Equations 18 and 19:

$$P_F = \frac{P1}{P2} \quad (18)$$

$$P_B = \frac{P3}{P2} \quad (19)$$

Figure 10:
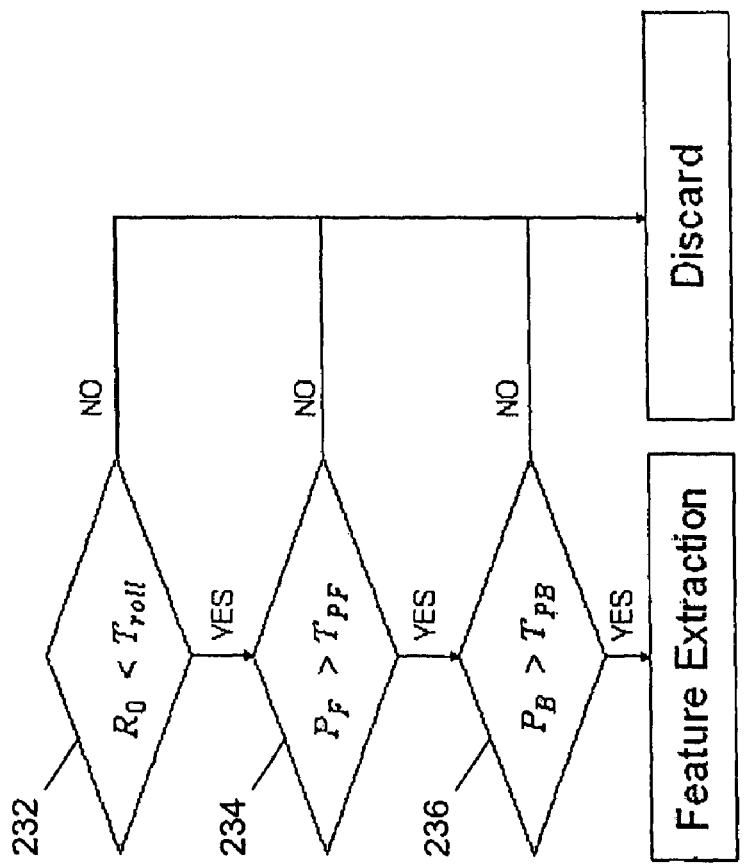
FIG. 10 illustrates a flow chart of an exemplary embodiment of Decision 2 in FIG. 2.

Any or all of these parameters may be compared with experimentally determined thresholds to assess the acceptability of the image in decision 2 of step 230 (340) of FIG. 2. In the particular embodiment shown in FIG. 10, in step 232, the rolling degree $R_0$ is compared with a rolling threshold $T_{roll}$, in step 234, the forward pitch $P_F$ is compared with a forward pitch threshold $T_{PF}$, and, in step 236, the backward pitch $P_B$ is compared with a backward pitch threshold $T_{PB}$. If any of these thresholds is not met, then the image may be discarded, and another input image may be received in step 202 (302). Otherwise, image selection of step 242 forwards the image to a known feature extraction analysis.

Thus, in accordance with exemplary embodiments of the present invention, a system and a method for determining the acceptability of a fingerprint image for fingerprint recognition may address at least one of the above problems, i.e., focus, quality and position. An acceptable fingerprint image may then be analyzed in a known manner, as set forth, for example, in U.S. Pat. No. 7,073,711, entitled "Mobile Handheld Code Reader and Print Scanner System and Method," or U.S. Pat. No. 7,072,523, entitled "System and Method for Fingerprint Image Enhancement Using Partitioned Least-Squared Filters," or U.S. Pat. No. 6,314,197, entitled "Determining an Alignment Between Two (Fingerprint) Images," the entirety of all of which is hereby incorporated by reference for all purposes.

If, for any reason, the fingerprint image is discarded, a signal may be output to a user indicating that the fingerprint image is unacceptable for fingerprint analysis. This indication may be simply that the fingerprint image has been discarded, or may indicate which decisions, i.e., threshold, has resulted in the fingerprint image has been discarded.

Exemplary embodiments of the present invention have been disclosed herein, and although specific terms are employed, they are used and are to be interpreted in a generic and descriptive sense only and not for purpose of limitation. For example, the processing of present invention may be implemented in software, e.g., by an article of manufacture having a machine-accessible medium including data that, when accessed by a machine, cause the machine to determine the acceptability of a fingerprint image. Accordingly, it will be understood by those of ordinary skill in the art that various changes in form and details may be made without departing from the spirit and scope of the present invention as set forth in the following claims.

What is claimed is:

1. A method of determining acceptability of an image of a fingerprint to be analyzed, the method comprising:
    dividing the image into a plurality of blocks;
    determining a focus for each block;
    determining a validity of a block, the block being valid if the focus is sufficient, otherwise the block being invalid;
    totaling a number of valid blocks in the image; and
    determining a validity of the image, the image being valid if a number of valid blocks is sufficient, and
    if the image is valid:
        detecting a core and a contour of the image,
        determining a rolling degree and a pitching degree from the core and the contour using a processor, and
        selecting the image for further processing when the rolling degree and the pitching degree are sufficiently small.

2. The method as claimed in claim 1, wherein the number of valid blocks is sufficient if a ratio of the number of valid blocks to the plurality of blocks exceeds a predetermined threshold.

3. The method as claimed in claim 1, wherein determining whether the block is sufficiently focused includes comparing a measured focus to a focus threshold determined from a blur model.

4. The method as claimed in claim 1, further comprising:
    determining, for each block, whether the block includes a repeatable pattern, and wherein determining the status of the block includes determining the block to be valid when the block is sufficiently focused and has a repeatable pattern, otherwise, determining the block to be invalid.

5. The method as claimed in claim 4, wherein determining whether the block includes a repeatable pattern includes determining a quality index that includes coherence and symmetry of a gradient distribution of the block.

6. The method as claimed in claim 5, wherein the quality index is a weighted sum of the coherence and symmetry.

7. The method as claimed in claim 1, wherein determining the rolling degree comprises:
    determining a left distance between the core and a left edge of the contour;
    determining a right distance between the core and a right edge of the contour; and
    determining the rolling degree to be proportional to a ratio between an absolute difference between the right and left distances and a sum of the right and left distances.

8. The method as claimed in claim 1, wherein determining the pitching degree comprises:
    determining a forwards pitching degree; and
    determining a backwards pitching degree.

9. The method as claimed in claim 8, further comprising:
    determining a first distance from the core to a front edge of a valid region;
    determining a second distance from the core to a front of the contour; and
    determining a third distance from the core to a back edge of the valid region, wherein the forwards pitching degree is proportional to a ratio of the first distance to the second distance and the backwards pitching degree is proportional to a ratio of the third distance to the second distance.

10. The method as claimed in claim 9, wherein the front edge of the valid region and the back edge of the valid region are determined such that a width of the valid region at either of the front and back edges is larger than half of a width of left and right edges of the contour.

11. The method as claimed in claim 1, wherein determining the pitching degree comprises:
    determining a left distance $D_L$ between the core and a left edge of the contour;
    determining a right distance $D_R$ between the core and a right edge of the contour;
    determining a front distance $D_F$ from the core to a front edge of a valid region;
    determining a back distance $D_B$ from the core to a back edge of the valid region; and
    setting N to be greater than a ratio between a width and height of the valid region, wherein the pitching degree equals $N-(D_F+D_B)/(D_L+D_R)$.

12. The method as claimed in claim 11, wherein the front edge of the valid region and the back edge of the valid region are determined such that a width of the valid region at either of the front and back edges is larger than half of a width of left and right edges of the contour.

13. The method as claimed in claim 1, further comprising generating the image using a camera.

14. The method as claimed in claim 13, wherein the camera is part of a handheld device.

15. The method as claimed in claim 1, wherein determining if the block is sufficiently focused includes using a Variance-Modified-Lapalacian of Gaussian (VMLOG) method.

16. The method as claimed in claim 15, wherein the VMLOG method includes at least one of the following equations:

$$\nabla_M^2 [G*I] = \max\left\{\frac{\partial^2(G*I)}{\partial x^2}, \frac{\partial^2(G*I)}{\partial y^2}\right\};$$

$$MLOG_x = \sum_{k=-N}^{N} \omega_k I(x - k(\text{step}), y);$$

$$MLOG_Y = \sum_{k=-N}^{N} \omega_k I(x, y - k(\text{step}));$$

$$MLOG = \max\{MLOG_x, MLOG_y\}; \text{ and}$$

$$VMLOG = \text{VAR}\{MLOG\}.$$

17. A method of determining acceptability of an image of a fingerprint to be analyzed, the method comprising:
    dividing the image into a plurality of blocks;

determining, for each block, whether a block includes a repeatable pattern;

determining a validity of a block, the block being valid if the block includes a repeatable pattern, otherwise the block being invalid;

totaling a number of valid blocks in the image; and determining the image is valid if the number of valid blocks is acceptable, and if the image is valid:

detecting a core and a contour of the image, determining a rolling degree and a pitching degree from the core and the contour using a processor, and selecting the image for further processing when the rolling degree and the pitching degree are sufficiently small.

18. The method as claimed in claim 17, wherein the number of valid blocks is acceptable if a ratio of the number of valid blocks to the plurality of blocks exceeds a predetermined threshold.

19. An article of manufacture having a computer readable medium including data that, when accessed by a computer, cause the computer to determine acceptability of an image of a fingerprint to be analyzed, the determining comprising:

dividing the image into a plurality of blocks;

determining, for each block, whether the block is in focus;

determining a status of a block, the block being valid if the block is in focus, otherwise the block being invalid;

totaling a number of valid blocks in the image; and determining the image is valid if the number of valid blocks is acceptable, and if the image is valid:

detecting a core and a contour of the image, determining a rolling degree and a pitching degree from the core and the contour, and selecting the image for further processing when the rolling degree and the pitching degree are sufficiently small.

20. The article as claimed in claim 19, wherein the number of valid blocks is acceptable if a ratio of the number of valid blocks to the plurality of blocks exceeds a predetermined threshold.

21. An apparatus for determining acceptability of an image of a fingerprint to be analyzed, the apparatus comprising:

a divider for dividing the image into a plurality of blocks;

a focus estimator for determining, for each block, whether the block is sufficiently focused;

a focus decider for comparing focus of a block with a threshold focus, the block being valid if the block is sufficiently focused, otherwise the block being invalid;

a validity decider for totaling a number of valid blocks in the image, the image being valid if the number of valid blocks is acceptable;

a detector for detecting a core and a contour of the image when the image is valid;

a processor for determining a rolling degree and a pitching degree from the core and the contour, and selecting the image for further processing when the rolling degree and the pitching degree are sufficiently small.

\* \* \* \* \*